(12) United States Patent
Singhvi (10) Patent No.: US 11,070,528 B2
(45) Date of Patent: *Jul. 20, 2021

(54) REMOTE DATA QUERIES ON SECURE DEVICES

(71) Applicant: DvSum, LLC, Sunnyvale, CA (US)

(72) Inventor: Aashish Singhvi, Foster City, CA (US)

(73) Assignee: DvSum, LLC, Sunnyvale, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/508,451

(22) Filed: Jul. 11, 2019

(65) Prior Publication Data

US 2019/0334877 A1 Oct. 31, 2019

Related U.S. Application Data

(63) Continuation of application No. 15/097,577, filed on Apr. 13, 2016, now Pat. No. 10,397,192.

(60) Provisional application No. 62/149,541, filed on Apr. 18, 2015.

(51) Int. Cl.
*H04L 29/06* (2006.01)
*G06F 21/44* (2013.01)

(52) U.S. Cl.
CPC .......... *H04L 63/0428* (2013.01); *G06F 21/44* (2013.01); *H04L 63/0281* (2013.01); *H04L 63/08* (2013.01)

(58) Field of Classification Search
CPC . H04L 63/0428; H04L 63/0281; H04L 63/08; G06F 21/44
See application file for complete search history.

(56) References Cited

U.S. PATENT DOCUMENTS

| 6,615,258 B1 | 9/2003 | Barry et al. |
| 8,543,665 B2 * | 9/2013 | Ansari ............... H04L 67/104 709/218 |
| 2002/0031230 A1 | 3/2002 | Sweet et al. |
| 2010/0217837 A1 | 8/2010 | Ansari et al. |
| 2010/0332401 A1 | 12/2010 | Prahlad et al. |
| 2014/0020083 A1 | 1/2014 | Fetik |

* cited by examiner

*Primary Examiner* — Joseph P Hirl
*Assistant Examiner* — Thomas A Gyorfi
(74) *Attorney, Agent, or Firm* — Total Awareness Consulting Services; Robert Winslow (57) ABSTRACT

An assistant computing device communicates with a requesting computing device. The requesting computing device communicates with a remote computing device. The remote computing device in communication with a dataset resides in a secured data center. The requesting computing device: employs credentials to communicate requests to the remote computing device over an external network and through a firewall; and receives query results generated by the remote computing device executing the requests. The assistant computing device: receives requests from the requesting computing device to query the dataset; generates access credentials; encrypts and communicates the access credentials to the requesting computing device; receives encrypted results from the requesting computing device; decrypts and communicates the results to the requesting computing device.

20 Claims, 8 Drawing Sheets

REMOTE DATA QUERIES ON SECURE DEVICES

CROSS-REFERENCE TO RELATED APPLICATIONS

This application is a continuation of U.S. patent application Ser. No. 15/097,577, filed Apr. 13, 2016, which claims the benefit of U.S. Provisional Application No. 62/149,541, filed Apr. 18, 2015, which are all hereby incorporated by reference in their entirety.

BACKGROUND

Data security is an important issue. There is a need to enable users to securely and remotely query and process data that is sitting inside a secure network.

DETAILED DESCRIPTION OF EMBODIMENTS

Some of the various embodiments of the present invention relate to remotely accessing data on a secured server. According to some of the various embodiments, SaaS (Software as A Service) tools may securely query and process data that is sitting inside a secure network by using a user workstation as a bridge to pass instructions to a secured data server and receiving the results for further processing and reporting. In this way, embodiments may provide security and scalability of enterprise tools to the SaaS based tools. A volume data comprising the data may remain in the host environment and processing of data done on the host environment. This may enable higher security of data. Since the processing occurs on the host environment, the latency of data may be low. Scalability may be increased since the SaaS data tools do not need the same storage and computing capacity as the host environment. This may allow some of the various embodiments to provide high service levels to the end user.

Some of the various embodiments may enable businesses to leverage new technologies and solutions that are owned and operated by third parties to work directly with their enterprise data in a secure fashion and the without the need to install these applications in their own network or by providing direct access to data to these applications.

Figure 1:
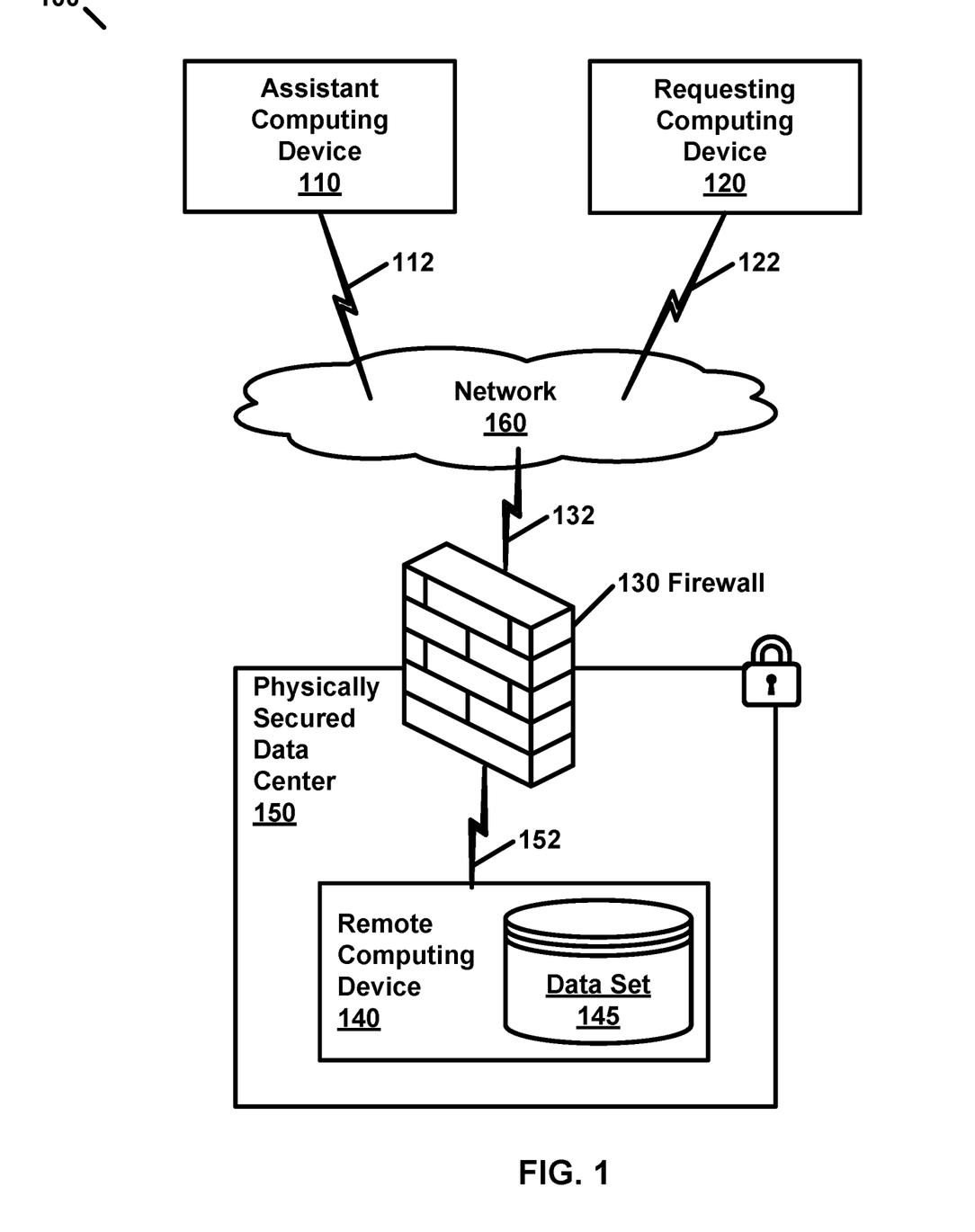
FIG. 1 is an example block diagram showing a system for remotely accessing data on a remote secured server according to some of the various embodiments of the present invention.

FIG. 1 is an example block diagram showing a system 100 for remotely accessing data 145 on a remote secured server 140 according to some of the various embodiments of the present invention. As illustrated in this example system, an assistant computing device 100 assists a requesting computing device 120 to access a data set 145 via a remote computing device 140 over a network 160. In this alternative embodiment, requesting computing device 120 and assistant computing device 110 may reside outside of physically secured data center 150. Remote computing device 140 may reside inside physically secured data center 150. Assistant computing device 110 may communicate to requesting computing device 120 through network 160 via communication links 122 and 112. Assistant computing device 110 may communicate to remote computing device 140 through network 160 and firewall 130 via communication links 112, 132 and 152. Requesting computing device may communicate to remote computing device 140 through network 160 and firewall 130 via communication links 122, 132 and 152.

The remote computing device 140 may comprise a computing device such as, but not limited to: a personal computing device (PC, tablet or phone), a distributed computing device (e.g. a server) that comprises the data which the requester is trying to query and analyze, a combination thereof, and/or the like. According to some of the various embodiments, the remote computing device 140 could be the same as the requesting computing device 120 (when the dataset 145 is located on the same device) but more often than not, the remote computing device 140 and requesting computing device 120 are separate devices. The remote computing device may serve data remotely by receiving and processing queries received. (An example of a typical query format is Sequential Query Language (SQL)).

According to some of the various embodiments, the remote computing device 140 may reside in a physically secured data center 150. The term "data center," as applied herein may to specially designed computer rooms. A data center may comprise a facility used to house computer systems and associated components, such as telecommunications and storage systems. Data center(s) generally includes redundant or backup power supplies, redundant data communications connections, environmental controls (e.g., air conditioning, fire suppression) and various security devices. Communications in data centers may be based on networks running, for example, an IP protocol suite. Data centers may comprise a set of routers and switches that transport traffic between the servers and to the outside world. Redundancy of the Internet connection may be provided by using two or more upstream service providers. Some of the servers at the data center may be employed for running the basic Internet and intranet services needed by internal users in the organization, e.g., e-mail servers, proxy servers, and DNS servers. Network security elements may also be deployed. Examples of network security elements may comprise, but are not limited to: firewalls, VPN gateways, intrusion detection systems, combinations thereof, and/or the like. Also common are monitoring systems for the network and some of the applications. Additional off site monitoring systems are also typical, in case of a failure of communications inside the data center.

The data center 150 may be secured. For example, physical access to the site may be restricted to selected personnel, with controls such as, for example, a layered security system. A layered security system may comprise elements such as fencing, bollards and mantraps. Video camera surveillance and permanent security guards may be present.

A mantrap, may comprise a physical security access control system comprising a small space with two sets of interlocking doors, such that the first set of doors must close before the second set opens. In a manual mantrap, a guard may lock and unlock each door in sequence. An intercom and/or video camera may be employed to allow the guard to control the trap from a remote location. In an automatic mantrap, identification may be required for each door, sometimes even possibly different measures for each door. For example, a key may open the first door, but a personal identification number entered on a number pad opens the second. Other methods of opening doors include proximity cards or biometric devices such as fingerprint readers, facial recognition systems, iris recognition scans, combinations thereof, and/or the like. Metal detectors may be built in, in order to prevent entrance of people carrying weapons.

According to some of the various embodiments, the physically secure data center 150 may comprise a physical facility that is owned or leased. The physically secure data center 150 may house the remote computing device 140 and/or the dataset 145 being accessed. The physical facility could be the same location where the requesting computing device 120 is located or could be located in a different place. The dataset 145 may be located in remote computing device 140 and be accessible by the requesting computing device 120 using access credentials. The access credentials may according to some embodiments, be optional.

According to some of the various embodiments, the remote computing device 140 may be in communication with a data set 145. A data set 145 (or data set 145) may comprise a collection of data. The collection of data may correspond to contents of database(s). Examples of databases comprise, but are not limited to: a relational database data set; (e.g. Oracle, DB2, Access); a non-relational database data set; (e.g. NOSQL); a web service query responsive data set; (e.g. SalesForce.com); an application specific query responsive data set; (e.g. SAP); a comma-separated-values (CSV) data set; a spreadsheet data set; (e.g. Microsoft Excel); a plain text data set; hierarchical format database(s); propriety format(s) (example Microsoft Excel); combinations thereof, and/or the like. According to some embodiments, a data set 145 may correspond to the contents of a statistical data matrix. The data set 145 may comprise value(s) for variable(s). Each value may be referred to as a datum. The data set 145 may comprise data for one or more members. According to some of the various embodiments, the term data set 145 may refer to the data in a collection of closely related tables, corresponding to a particular experiment or event. The data set 145 may be located, for example, on a network accessible drive, within the remote computing device 140, or other location with communication of the remote computing device 140.

The remote computing device by its definition can serve the data remotely by receiving and processing queries received. (example of typical query format is Sequential Query Language (SQL))

The data set 145 may be stored on a data storage device. A data storage device may comprise a device for recording and/or storing information (data). Examples of data storage devices comprise, but are not limited to: tangible storage mediums, Read-only memory, Random Access memories, flash drives, disk drives, network accessible drives, magnetic tape, optical drives, combinations thereof, and/or the like.

According to some of the various embodiments, the remote computing device 140 may be configured to communicate with an external network through a firewall. A firewall may comprise a network security system that controls incoming and outgoing network traffic based on an applied rule set. A firewall may establish a barrier between a trusted, secure internal network and another network (e.g., the Internet) that is assumed not to be secure and trusted. Firewalls may exist both as software to run on general purpose hardware and as a hardware appliance. Many firewalls may also offer other functionality to the internal network they protect, such as acting as a DHCP server for that network. Some firewalls may be implemented as software in combination with hardware and/or virtual. According to some of the various embodiments, the firewall may comprise a routing function abilities that pass data between networks and components.

A security Appliance may comprise a network security system that controls the incoming and outgoing network traffic based on an applied rule set. The appliance may establish a barrier between a trusted, secure internal network and another network (e.g., the Internet) that is assumed not to be secure and trusted. The security appliance may exist as a hardware appliance, software appliance or software program. An example of security appliance is a firewall.

Requesting computing device 120 may comprise a computing device configured to initiate a request such as, but not limited to: a personal computing device (e.g. PC, Tablet, and Phone), a distributed computing device (server), combinations thereof, and/or the like. The first step in the flow of information may be initiated by the requesting computing device 120. During the time of this request, the requesting computing device 120 may be located within a company's internal network or have access to a company's network (For example, over a virtual private network (VPN)).

According to some of the various embodiments, a request may be initiated on a requesting computing device 120 by a requester. A requester may, for example without limitation, comprise a human user or a machine program that initiates the request for information. A human user may initiate a request when he or she needs the information. The machine program may comprise, for example, a monitoring program that may be configures to initiate a request for information based on the occurrence of an event. The event could, for example, be the passage of time or could be a trigger event that occurs. For example, a trigger event could be the arrival of a new data file or completion of a batch schedule.

According to some of the various embodiments, a request may employ, for example without limitation, hypertext transfer protocol. (HTTP or HTTPS). The request may, for example, be specifically related to data that exists on the remote computing device 140. The request may be configured, for example, to query data (read-only), manipulate data. (write), combinations thereof, and/or the like. Examples of requests may comprise without limitation: 1) run an audit on a date of birth field of a people dataset; 2) profile columns of a people dataset; 3) if the date of birth format is mm-dd-yyyy, then convert to mm/dd/yyyy; 4) retrieve sales by quarter; combinations thereof, and/or the like.

According to some of the various embodiments, a requesting computing device 120 may be configured to employ credentials to communicate remote instructions to the remote computing device 140 over an external network 160 and through firewall 130. Credentials may comprise, for example access credentials. Access credentials may comprise a set of information required to connect and query the remote computing device 140. The information may comprise, for example, one or more of remote server address(es), port number(s), database or application instance name(s), database schema name(s), login(s), password(s), file path name(s), combinations thereof, and/or the like.

According to some of the various embodiments, a requesting computing device 120 may be configured to receive query results from the remote computing device 140. The query results may be generated by the remote computing device 140 executing remote instructions. Query Results may comprise data received back from the remote computing device 140 as a result of processing query instruction(s). Data received back may comprise, for example, a single value, a result set which consists of a set of rows from a database, metadata comprising the name of the column of data, combinations thereof, and/or the like. For data manipulation queries, the result returned may comprise, for example, metadata representing the success or failure of an operation. For example, the result returned may comprise a number of rows updated.

The requesting computing device 120 may be configured to convert the query results into a Flexible Data Representation (FDR) format. A Flexible Data Representation (FDR) may comprise a language independent format that employs human-readable text to transmit data objects as attribute-value pairs. An FDR may be employed to transmit query results between requesting computing device(s) 120 and assistant computing device(s) 110. The format may enables transmitting data in a byte-optimized format configured to support attributes or columns of data and various number of records.

According to some of the various embodiments, an assistant computing device 110 may be a distributed computing device configured to handle requests from requesting computing device(s), process and analyze the request(s), co-ordinate the flow of information; provide answers to a requester, combinations thereof, and/or the like. Assistant computing device 110 may comprise a server, a personal computer, an embedded system, combinations thereof, and/or the like.

According to some of the various embodiments, an assistant computing device 110 may be configured to receive a request from the requesting computing device 120 to query the data set 145. The request may be configured to identify the remote computing device 140. The assistant computing device 110 may be configured to communicate with the requesting computing device 120 via various mechanisms such as, but not limited to: an external network (e.g. Internet), an internal network, a wide area network WAN, a Local Area Network LAN, a virtual private network (VPN), a combination thereof, and/or the like.

According to some of the various embodiments, the assistant computing device 110 may be configured to identify the access credential requirements to allow the requesting computing device 120 to access the remote computing device 140.

According to some of the various embodiments, the assistant computing device 110 may be configured to generate access credentials, employing at least in part, the access credential requirements.

According to some of the various embodiments, the assistant computing device 110 may be configured to identify remote processing requirements for the remote computing device 150 to access the data set 145 identified in the request. The assistant computing device 110 may be further configured to generate remote processing instructions, employing at least in part, the remote processing requirements, the remote processing instructions may be configured to be executable by the remote computing device to satisfy the request; (few flow diagrams may be useful). Remote processing instructions may comprise data processing instruction set(s) specific to the data source in the remote computing device 140 that may be employed to process and retrieve data 145. Example of instructions in the data processing instruction may comprise, for example, retrieving data (e.g. querying and selecting), manipulating data (e.g. writing data like Add, Delete, and Update), combinations thereof, and/or the like. Example of a remote instruction may comprise: 1) for a direct database query: SELECT COUNT(*) FROM EMPLOYEES; 2) for an SAP application: Call Function Module Z_ABC and send parameters; 3) for a web application: Call Web Service Method getEmployees passing the filter criteria; and/or the like.

According to some of the various embodiments, the assistant computing device 110 may be configured to encrypt the access credentials to generate encrypted access credentials. Similarly, the assistant computing device 110 may be configured to encrypt the remote processing instructions to generate encrypted remote processing instructions. Encryption may convert the access credentials and/or remote processing instructions into non-readable text by applying a cryptographic algorithm. Examples of crypto algorithm are RSA, SHA-1, SHA-2 with 64, 128 or 256 bits of encryption.

A cipher may be employed to perform encryption and decryption. A cipher may comprise a pair of algorithms that create the encryption and the reversing decryption. Ciphers may be categorized as symmetric key algorithms and asymmetric key algorithms. Examples of ciphers comprise, but are not limited to: AES_128 (a private key algorithm) and ECDHE_RSA (a public key algorithm).

According to some of the various embodiments, the assistant computing device 110 may be configured to employ the encrypted access credentials to electronically communicate the encrypted remote processing instructions to the requesting computing device. The encrypted access credentials may be configured to include at least one of the following: remote login instructions; remote computing device information name; remote computing device login password; remote computing device port number; remote computing device data store name; remote computing device login name; physically secured data center information name; physically secured data center access password; physically secured data center port number; physically secured data center login name; a cryptographic key, a combination thereof, and/or the like.

According to some of the various embodiments, the assistant computing device 110 may be configured to receive at least one set of encrypted results from the requesting computing device. According to some of the various embodiments, the assistant computing device 110 may be configured to decrypt the encrypted results to obtain results.

According to some of the various embodiments, the assistant computing device 110 may be configured to generate a report of results.

The report may comprise a presentation of quantitative and qualitative information to a user based on factual data, interpreted data, user input, combinations thereof, and/or the like. For example, a report on the result of a data quality audit to validate date of birth in mm/dd/yyyy format could comprise: quantitative information like total number of records processed, total number of records failing the audit and the detailed records themselves; qualitative information like whether the audit passed the audit threshold, trend information based on reconciling data with history, any system generated or user input comments; combinations thereof, and/or the like.

The report may further comprise additional information, the additional information comprising at least one of the following: logic; trending information; template information; intelligence information; benchmark information; data quality information; decision support information; data analysis information; combinations thereof, and/or the like. Additionally, the report may be configured to be accessed via a browser. According to some of the various embodiments, the assistant computing device 110 may be configured to communicate the report to the requesting computing device through network 160 via communication links 112 and 122.

Figure 2:
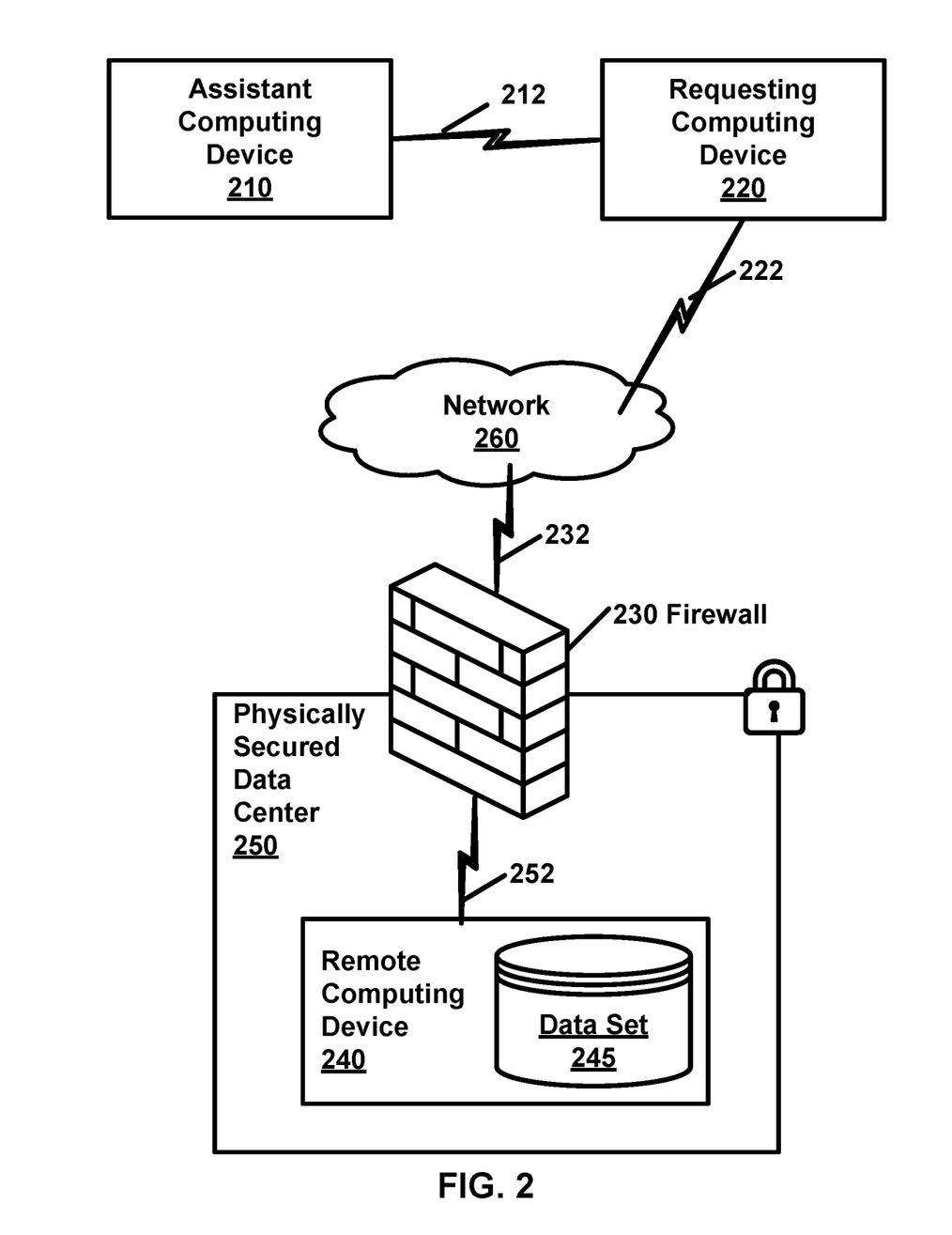
FIG. 2 is another example block diagram showing a system for remotely accessing data on a remote secured server according to some of the various embodiments of the present invention.

FIG. 2 is another example block diagram showing a system 200 for remotely accessing data from a dataset 245 on a remote secured server 240 according to some of the various embodiments of the present invention. This alternative embodiment illustrates assistant computing device 210 communicating with requesting computing device 220 via link 212 outside of network 260. Example embodiments of the invention as illustrated in FIG. 2 are described with reference to the accompanying drawings, wherein like parts are designated by like reference numerals to FIG. 1 throughout. So for example, the decryption with respect to remote computing device 140 may also be applicable to remote computing device 240.

The remote computing device 240 may comprise a computing device such as, but not limited to: a personal computing device (PC, tablet or phone), a distributed computing device (e.g. a server) that comprises the data which the requester is trying to query and analyze, a combination thereof, and/or the like. According to some of the various embodiments, the remote computing device may serve data remotely by receiving and processing received queries. (An example of a typical query format is Sequential Query Language (SQL)).

According to some of the various embodiments, the remote computing device 240 may reside in a physically secured data center 250. According to some of the various embodiments, the physically secure data center 250 may comprise a physical facility that is owned or leased. The physically secure data center 250 may house the remote computing device 240 and/or the dataset 245 being accessed. The physical facility could be the same location where the requesting computing device 220 is located or could be located in a different place. The dataset 245 may be located in remote computing device 240 and be accessible by the requesting computing device 220 using access credentials. The access credentials may according to some embodiments, be optional.

According to some of the various embodiments, the remote computing device 240 may be in communication with a data set 245. A data set 245 (or data set 245) may comprise a collection of data. The collection of data may correspond to contents of database(s). The remote computing device may be configured to serve data remotely by receiving and processing received queries.

The data set 245 may be stored on a data storage device. According to some of the various embodiments, the remote computing device 240 may be configured to communicate with an external network 260 through a firewall 230 via communication links 252 and 232.

Requesting computing device 220 may comprise a computing device configured to initiate a request such as, but not limited to: a personal computing device (e.g. PC, Tablet, and Phone), a distributed computing device (server), combinations thereof, and/or the like. The flow of information may be initiated by the requesting computing device 220. As illustrated, requesting computing device is outside the physically secured data center 250 and may communicate to the physically secured data center 250 via links 222, 232 and 252 through network 260 and firewall 230.

According to some of the various embodiments, a request may be initiated on a requesting computing device 220 by a requester. According to some of the various embodiments, a requesting computing device 220 may be configured to employ credentials to communicate remote instructions to the remote computing device 240 over an external network 260 and through firewall 230 via communication links 222, 232, and 252. Credentials may comprise, for example access credentials. Access credentials may comprise a set of information required to connect and query the remote computing device 240.

According to some of the various embodiments, a requesting computing device 220 may be configured to receive query results from the remote computing device 240. The query results may be generated by the remote computing device 240 executing remote instructions. Query Results may comprise data received back from the remote computing device 240 as a result of processing query instruction(s).

The requesting computing device 220 may be configured to convert the query results into a Flexible Data Representation (FDR) format. An FDR may be employed to transmit query results between requesting computing device(s) 220 and assistant computing device(s) 210 via communications link 212.

According to some of the various embodiments, assistant computing device 210 may be a distributed computing device configured to handle requests from requesting computing device(s), process and analyze the request(s), co-ordinate the flow of information; provide answers to a requester, combinations thereof, and/or the like. Assistant computing device 210 may comprise a server, a personal computer, an embedded system, combinations thereof, and/or the like.

According to some of the various embodiments, an assistant computing device 210 may be configured to receive a request from the requesting computing device 220 via communications link 212 to query the data set 245. The request may be configured to identify the remote computing device 240. The assistant computing device 210 may be configured to communicate with the requesting computing device 220 via various mechanisms such as, but not limited to: an external network (e.g. Internet), an internal network, a wide area network WAN, a Local Area Network LAN, a virtual private network (VPN), a combination thereof, and/or the like.

According to some of the various embodiments, the assistant computing device 210 may be configured to identify the access credential requirements to allow the requesting computing device 220 to access the remote computing device 240. According to some of the various embodiments, the assistant computing device 210 may be configured to generate access credentials, employing at least in part, the access credential requirements.

According to some of the various embodiments, the assistant computing device 210 may be configured to identify remote processing requirements for the remote computing device 250 to access the data set 245 identified in the request. The assistant computing device 210 may be further configured to generate remote processing instructions, employing at least in part, the remote processing requirements, the remote processing instructions may be configured to be executable by the remote computing device to satisfy the request; (few flow diagrams may be useful). Remote processing instructions may comprise data processing instruction set(s) specific to the data source in the remote computing device 240 that are employed to process and retrieve data 245.

According to some of the various embodiments, the assistant computing device 210 may be configured to encrypt the access credentials to generate encrypted access credentials. Similarly, the assistant computing device 210 may be configured to encrypt the remote processing instructions to generate encrypted remote processing instructions.

According to some of the various embodiments, the assistant computing device 210 may be configured to employ the encrypted access credentials to electronically communicate the encrypted remote processing instructions to the requesting computing device. According to some of the various embodiments, the assistant computing device 210 may be configured to receive at least one set of encrypted results from the requesting computing device. According to some of the various embodiments, the assistant computing device 210 may be configured to decrypt the encrypted results to obtain results. According to some of the various embodiments, the assistant computing device 210 may be configured to generate a report of results. According to some of the various embodiments, the assistant computing device 210 may be configured to communicate the report to the requesting computing device 220 via link 212.

Figure 3:
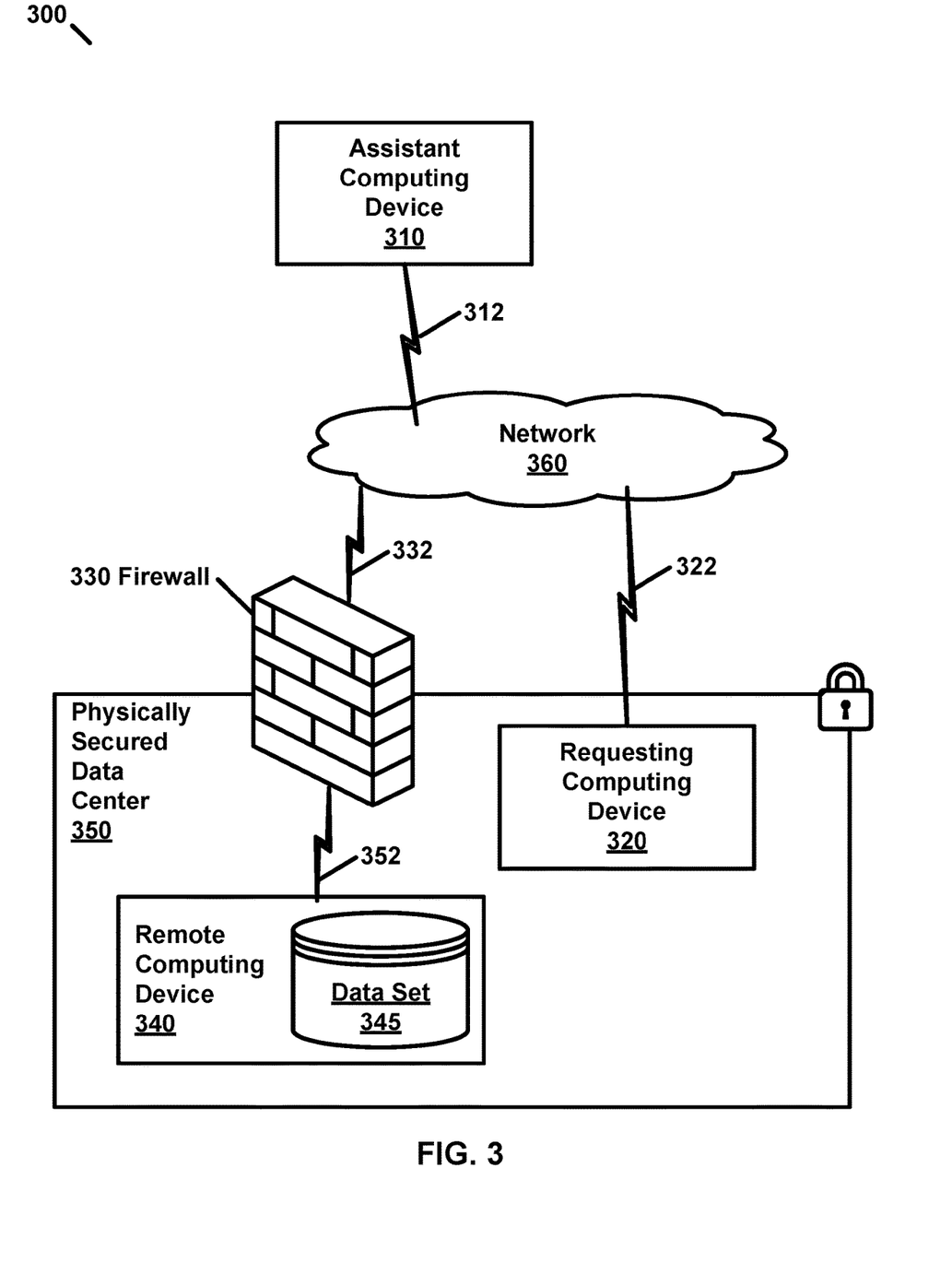
FIG. 3 is another example block diagram showing a system for remotely accessing data on a remote secured server according to some of the various embodiments of the present invention.

FIG. 3 is another example block diagram showing a system 300 for remotely accessing data from a dataset 345 on a remote secured server 340 according to some of the various embodiments of the present invention. In this alternative embodiment, requesting computing device 320 and remote computing device 340 may reside inside physically secured data center 350. Assistant computing device 310 may reside outside of physically secured data center 350. Assistant computing device 310 may communicate to requesting computing device 320 through network 360 via communication links 322 and 312. Assistant computing device 310 may communicate to remote computing device 340 through network 360 and firewall 330 via communication links 312, 332 and 352. Requesting computing device may communicate to remote computing device 340 through network 360 and firewall 330 via communication links 322, 332 and 352. Example embodiments of the invention as illustrated in FIG. 3 are described with reference to the accompanying drawings, wherein like parts are designated by like reference numerals to FIG. 1 and FIG. 2 throughout. So for example, the decryption with respect to remote computing device 140 may also be applicable to remote computing device 340.

The remote computing device 340 may comprise a computing device such as, but not limited to: a personal computing device (PC, tablet or phone), a distributed computing device (e.g. a server) that comprises the data which the requester is trying to query and analyze, a combination thereof, and/or the like. According to some of the various embodiments, the remote computing device 340 could be the same as the requesting computing device 320 (when the dataset 345 is located on the same device) but more often than not, the remote computing device 340 and requesting computing device 320 may be separate devices. The remote computing device may serve data remotely by receiving and processing queries received. (An example of a typical query format is Sequential Query Language (SQL)).

According to some of the various embodiments, the remote computing device 340 may reside in a physically secured data center 350. According to some of the various embodiments, the physically secure data center 350 may comprise a physical facility that is owned or leased. The physically secure data center 350 may house the remote computing device 340 and/or the dataset 345 being accessed. The physical facility could be the same location where the requesting computing device 320 is located or could be located in a different place. The dataset 345 may be located in remote computing device 340 and be accessible by the requesting computing device 320 using access credentials. The access credentials may according to some embodiments, be optional.

According to some of the various embodiments, the remote computing device 340 may be in communication with a data set 345. A data set 345 (or data set 345) may comprise a collection of data. The collection of data may correspond to contents of database(s). The remote computing device may be configured to serve data remotely by receiving and processing received queries. The data set 345 may be stored on a data storage device. According to some of the various embodiments, the remote computing device 340 may be configured to communicate with an external network 360 through a firewall 330 via communication links 352 and 332.

Requesting computing device 320 may comprise a computing device configured to initiate a request such as, but not limited to: a personal computing device (e.g. PC, Tablet, and Phone), a distributed computing device (server), combinations thereof, and/or the like. The flow of information may be initiated by the requesting computing device 320. As illustrated, requesting computing device is physically located inside the physically secured data center 350 and may communicate to the remote computing device 340 via network 360 over communications link 322, and through firewall 330 via communications links 332 and 352.

According to some of the various embodiments, a request may be initiated on a requesting computing device 320 by a requester. According to some of the various embodiments, a requesting computing device 320 may be configured to employ credentials to communicate remote instructions to the remote computing device 340 over an external network 360 and through firewall 330 via communication links 322, 332, and 352. Credentials may comprise, for example access credentials. Access credentials may comprise a set of information required to connect and query the remote computing device 340.

According to some of the various embodiments, a requesting computing device 320 may be configured to receive query results from the remote computing device 340. The query results may be generated by the remote computing device 340 executing remote instructions. Query Results may comprise data received back from the remote computing device 340 as a result of processing query instruction(s).

The requesting computing device 320 may be configured to convert the query results into a Flexible Data Representation (FDR) format. An FDR may be employed to transmit query results between requesting computing device(s) 320 and assistant computing device(s) 310 via communications link 312.

According to some of the various embodiments, assistant computing device 310 may be a distributed computing device configured to handle requests from requesting computing device(s), process and analyze the request(s), co-ordinate the flow of information; provide answers to a requester, combinations thereof, and/or the like. Assistant computing device 310 may comprise a server, a personal computer, an embedded system, combinations thereof, and/or the like.

According to some of the various embodiments, an assistant computing device 310 may be configured to receive a request from the requesting computing device 320 via communications link 312 to query the data set 345. The request may be configured to identify the remote computing device 340. The assistant computing device 310 may be configured to communicate with the requesting computing device 320 via various mechanisms such as, but not limited to: an external network (e.g. Internet), an internal network, a wide area network WAN, a Local Area Network LAN, a virtual private network (VPN), a combination thereof, and/or the like.

According to some of the various embodiments, the assistant computing device 310 may be configured to identify the access credential requirements to allow the requesting computing device 320 to access the remote computing device 340. According to some of the various embodiments, the assistant computing device 310 may be configured to generate access credentials, employing at least in part, the access credential requirements.

According to some of the various embodiments, the assistant computing device 310 may be configured to identify remote processing requirements for the remote computing device 350 to access the data set 345 identified in the request. The assistant computing device 310 may be further configured to generate remote processing instructions, employing at least in part, the remote processing requirements, the remote processing instructions may be configured to be executable by the remote computing device to satisfy the request; (few flow diagrams may be useful). Remote processing instructions may comprise data processing instruction set(s) specific to the data source in the remote computing device 340 that are employed to process and retrieve data 345.

According to some of the various embodiments, the assistant computing device 310 may be configured to encrypt the access credentials to generate encrypted access credentials. Similarly, the assistant computing device 310 may be configured to encrypt the remote processing instructions to generate encrypted remote processing instructions.

According to some of the various embodiments, the assistant computing device 310 may be configured to employ the encrypted access credentials to electronically communicate the encrypted remote processing instructions to the requesting computing device. According to some of the various embodiments, the assistant computing device 310 may be configured to receive at least one set of encrypted results from the requesting computing device. According to some of the various embodiments, the assistant computing device 310 may be configured to decrypt the encrypted results to obtain results. According to some of the various embodiments, the assistant computing device 310 may be configured to generate a report of results. According to some of the various embodiments, the assistant computing device 310 may be configured to communicate the report to the requesting computing device 320 through network 360 via links 312 and 322.

Figure 4:
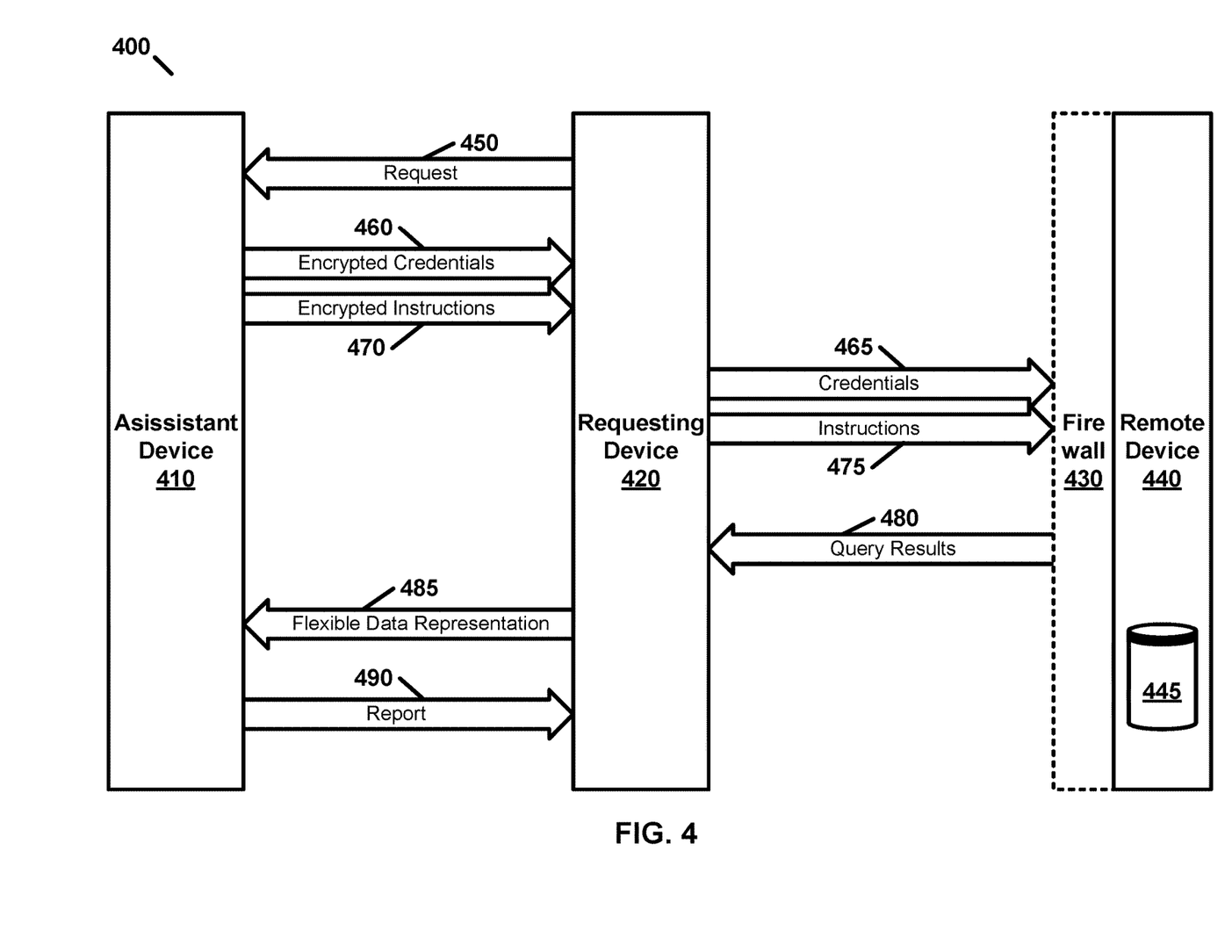
FIG. 4 is example block diagram showing communication flow between components in a system for remotely accessing data on a remote secured server according to some of the various embodiments of the present invention.

FIG. 4 is example block diagram showing communication flow between components in a system 400 for remotely accessing data 445 on a remote secured server 440 according to some of the various embodiments of the present invention.

According to some of the various embodiments, a request 450 may be made by a requesting computing device 420 to an assistant computing device 410 to query a dataset 445 in communication with a remote computing device 440. The remote computing device 440 may reside in a physically secured data center and may not be directly accessible to the assistant computing device 410.

According to some of the various embodiments, the assistant computing device 410 may identify access credential requirements to allow the requesting computing device 420 to access the remote computing device 440 identified in the request 450. According to some of the various embodiments, the assistant computing device 410 may identify remote processing requirements for the remote computing device 440 to access the dataset 445 identified in the request 450. According to some of the various embodiments, the assistant computing device 410 may generate access credentials, employing at least in part, the access credential requirements. According to some of the various embodiments, the assistant computing device 410 may generate remote processing instructions, employing at least in part, the remote processing requirements. The remote processing instructions may be configured to be executable by the remote computing device 440 to satisfy the request 450. According to some of the various embodiments, the assistant computing device 410 may encrypt the access credentials to generate encrypted access credentials 460. According to some of the various embodiments, the assistant computing device 410 may encrypt the remote processing instructions to generate encrypted remote processing instructions 470.

According to some of the various embodiments, the assistant computing device 410 may communicate the encrypted access credentials 460 to the requesting computing device 420. According to some of the various embodiments, the assistant computing device 410 may communicate the encrypted remote processing instructions 470 to the requesting computing device 420. The encrypted access credentials 460 may be configured to allow the requesting computing device 420 to access the remote computing device 440. The encrypted remote instructions 470 may comprise remote instructions configured to enable the remote computing device 440 to execute at least one of the following: at least one data query; and at least one data manipulation.

According to some of the various embodiments, the requesting computing device 420 may decrypt the encrypted access credentials 460 to obtain access credentials 465. According to some of the various embodiments, requesting computing device 420 may decrypt the encrypted remote instructions 470 to obtain remote instructions 475. The remote computing device 440 may be behind a firewall 430. According to some of the various embodiments, requesting computing device 420 may access the remote computing device 440 using the access credentials 465. According to some of the various embodiments, requesting computing device 420 may communicate the remote instructions 475 to the remote computing device 440.

According to some of the various embodiments, the remote computing device 440 may reside in a physically secured data center and not be directly accessible to the assistant computing device 410. According to some of the various embodiments, the remote computing device 440 may receive the remote instructions 475. The remote instructions may comprise remote instructions configured to enable the remote computing device 440 to execute at least one of the following: (1) at least one data query; and (2) at least one data manipulation. According to some of the various embodiments, the remote computing device 440 may execute the remote instructions 475 to generate query results 480. According to some of the various embodiments, the remote computing device 440 may communicate the query results 480 to the requesting device 420. At least part of the query results may be configured to be employable by the assistant computing device 410 to generate a report 490.

According to some of the various embodiments, the requesting computing device 420 may receive the query results. According to some of the various embodiments, the requesting computing device 420 may convert the query results 480 into a flexible data representation 485 of the query results 480. The conversion may involve encrypting the query results 480. According to some of the various embodiments, the requesting computing device 420 may communicate the flexible data representation 485 to the assistant computing device 410.

According to some of the various embodiments, the assistant computing device 410 may receive the flexible data representation 485 from the requesting computing device 420. According to some of the various embodiments, the assistant computing device 410 may process the flexible data representation 485 to obtain the query results 480. The processing may involve decrypting flexible data representation 485. According to some of the various embodiments, the assistant computing device 410 may generating a report of results 490 employing at least part of the query results 480. According to some of the various embodiments, the assistant computing device 410 may communicate the report 490 to the requesting computing device 420.

Figure 5:
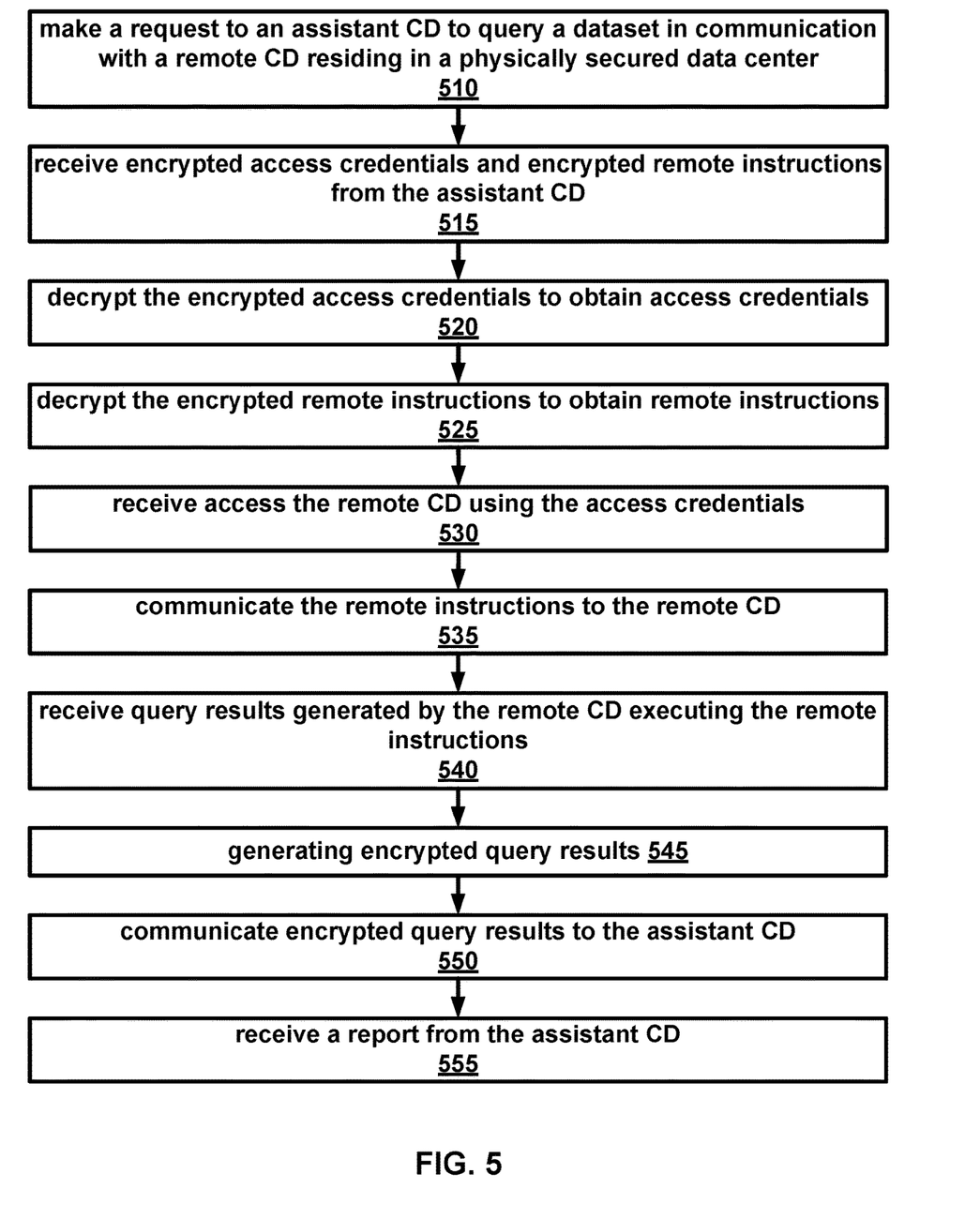
FIG. 5 is an example flow diagram illustrating remote access of secured data from the perspective of a requesting computing device according to some of the various embodiments of the present invention.
Figure 6:
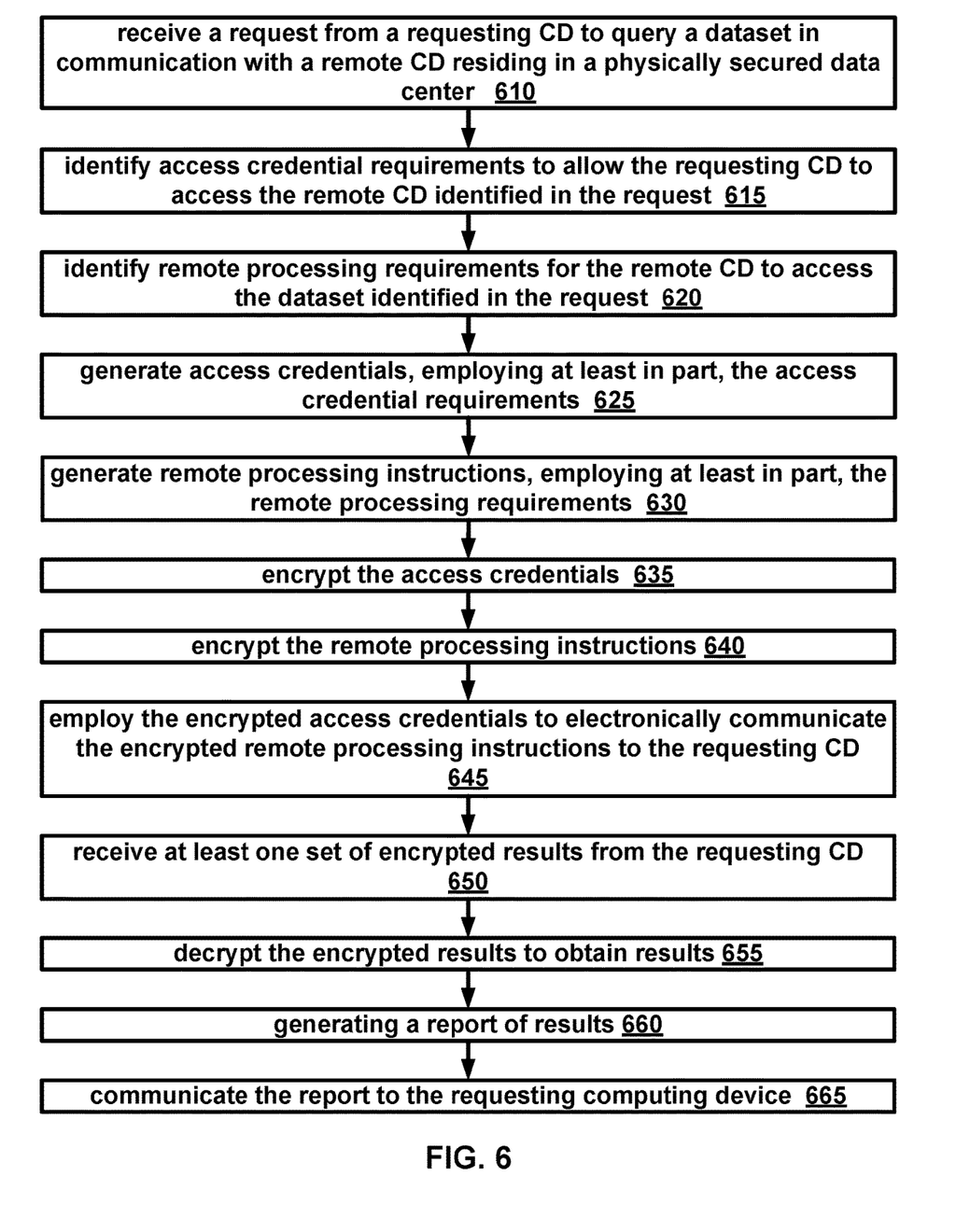
FIG. 6 is an example flow diagram illustrating remote access of secured data from the perspective of an assistant computing device according to some of the various embodiments of the present invention.
Figure 7:
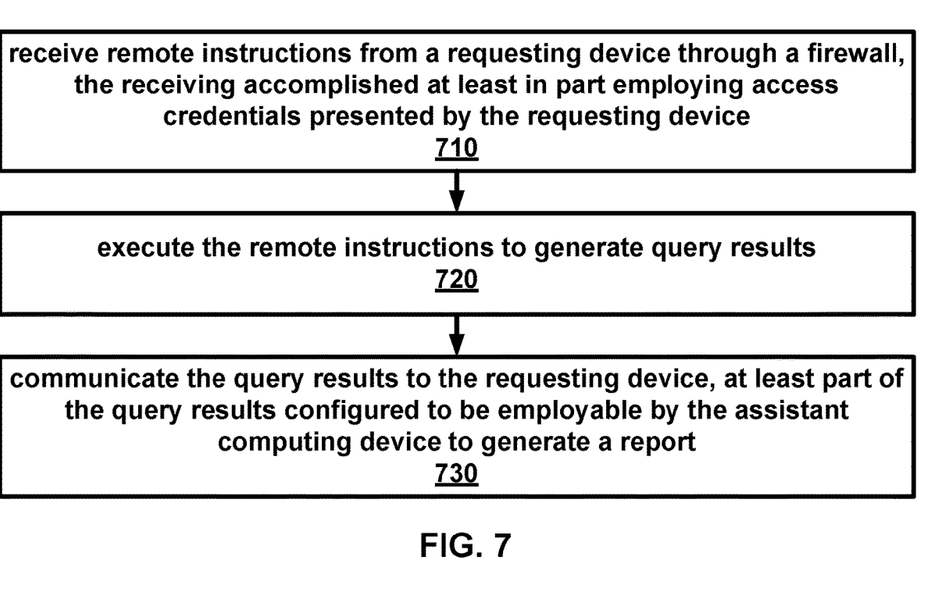
FIG. 7 is an example flow diagram illustrating remote access of secured data from the perspective of a remote computing device according to some of the various embodiments of the present invention.

FIGS. 5, 6 and 7 are example flow diagrams that together illustrate embodiments where a requesting computing device may access secured data from a remote computing device employing the assistance of an assistant computing device. Specifically, FIG. 5 illustrates remote access of secured data from the perspective of a requesting computing device, FIG. 6 illustrates remote access of secured data from the perspective of an assistant computing device, and FIG. 7 illustrates remote access of secured data from the perspective of a remote computing device. Additionally, FIGS. 5, 6 and 7 are to be interpreted with respect to the descriptions of various embodiments above of the requesting computing device, remote computing device, the assistant computing device, and their interconnections.

FIG. 5 is an example flow diagram illustrating remote access of secured data from the perspective of a requesting computing device according to some of the various embodiments of the present invention.

According to some of the various embodiments, a request may be made from a requesting computing device to an assistant computing device to query a dataset in communication with a remote computing device at 510. The remote computing device may reside in a physically secured data center. The remote computing device may not be directly accessible to the assistant computing device.

According to some of the various embodiments, encrypted access credentials and encrypted remote instructions may be received at the requesting computing device from the assistant computing device at 515. The encrypted access credentials may be configured to allow the requesting computing device to access the remote computing device. The encrypted remote instructions may comprise remote instructions configured to enable the remote computing device to execute at least one of the following: at least one data query; and at least one data manipulation.

According to some of the various embodiments, the encrypted access credentials may be decrypted by the requesting computing device to obtain access credentials at 520. Similarly, the encrypted remote instructions may be decrypted at the requesting computing device to obtain remote instructions at 525.

According to some of the various embodiments, the requesting computing device may access the remote computing device using the access credentials at 530. The remote instructions may be communicated from the requesting computing device to the remote computing device at 535. Query results may be generated by the remote computing device executing the remote instructions.

According to some of the various embodiments, query results from the remote computing device may be received at the requesting computing device at 540. The requesting computing device may generate encrypted query results by encrypting the query results at 545. The encrypted query results may be communicated from the requesting computing device to the assistant computing device at 550. At 555, the requesting computing device may receive a report from the assistant computing device. The report may comprise, at least in part, a decrypted version of at least a part of the encrypted query results.

FIG. 6 is an example flow diagram illustrating remote access of secured data from the perspective of an assistant computing device according to some of the various embodiments of the present invention.

According to some of the various embodiments, a request may be receiving at an assistant computing device over a network from a requesting computing device to query a dataset located on a remote computing device at 610. The remote computing device may reside in a physically secured data center. The remote computing device may not be directly accessible to the assistant computing device.

According to some of the various embodiments, access credential requirements may be identified to allow the requesting computing device to access the remote computing device identified in the request at 615. Similarly, remote processing requirements may be identified for the remote computing device to access the dataset identified in the request at 620.

According to some of the various embodiments, access credentials may be generated at 625 employing at least in part, the access credential requirements. Similarly, remote processing instructions may be generated at 630 employing at least in part, the remote processing requirements. The remote processing instructions may be configured to be executable by the remote computing device to satisfy the request.

According to some of the various embodiments, the access credentials may be encrypted at 635 to generate encrypted access credentials. Similarly, the remote processing instructions may be encrypted at 640 to generate encrypted remote processing instructions.

According to some of the various embodiment, the encrypted access credentials may be communicated to the requesting computing device at 640. Similarly, the encrypted remote processing instructions may be communicated to the requesting computing device at 645.

According to some of the various embodiments, at least one set of encrypted results may be received the requesting computing device at 650. The encrypted results may be decrypted at 655 to obtain the results. A report of the results may be generated at 660. The report may be communicated to the requesting computing device at 665.

FIG. 7 is an example flow diagram illustrating remote access of secured data from the perspective of a remote computing device according to some of the various embodiments of the present invention.

According to some of the various embodiments, remote instructions may be received at a remote computing device from a requesting device through a firewall at 710. The remote computing device may reside in a physically secured data center and not be directly accessible to an assistant computing device. The receiving may be accomplished, at least in part, employing access credentials presented by the requesting device. The encrypted access credentials may be configured to allow the requesting computing device to access the remote computing device. The encrypted remote instructions may comprise remote instructions configured to enable the remote computing device to execute at least one of the following: at least one data query; and at least one data manipulation.

According to some of the various embodiments, the remote instructions and access credentials may have been formed by the requesting device as follows. The requesting device may have made a request to the assistant computing device to query a dataset in communication with the remote computing device. The requesting device may have received encrypted access credentials and encrypted remote instructions from the assistant computing device. The requesting device may have decrypted the encrypted access credentials to obtain access credentials. Similarly, the requesting device may have decrypted the encrypted remote instructions to obtain remote instructions.

According to some of the various embodiments, remote computing device may execute the remote instructions to generate query results at 720. The query results may be communicated to the requesting device at 730. At least part of the query results may be configured to be employable by the assistant computing device to generate a report.

Figure 8:
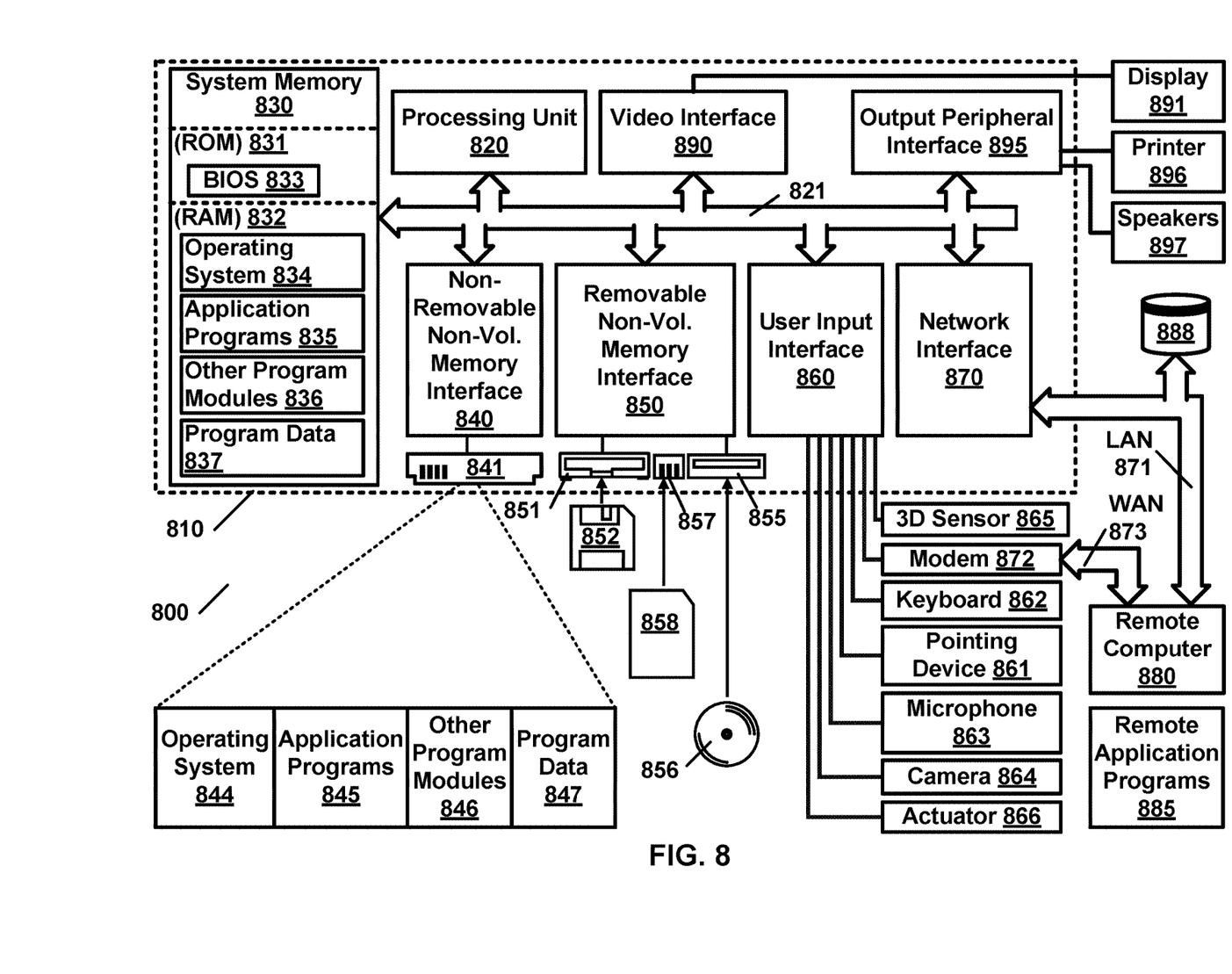
FIG. 8 illustrates an example of a suitable computing system environment on which aspects of some embodiments may be implemented.

FIG. 8 illustrates an example of a suitable computing system environment 800 on which aspects of some embodiments may be implemented. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by computing capable devices. Generally, program modules include routines, programs, objects, components, data structures, etc. that perform particular tasks or implement particular abstract data types. Some embodiments may be designed to be practiced in distributed computing environments where tasks may be performed by remote processing devices that are linked through a communications network. In a distributed computing environment, program modules may be located in both local and remote computer storage media including memory storage devices.

With reference to FIG. 8, an example system for implementing some embodiments includes a computing device 810. Components of computer 810 may include, but are not limited to, a processing unit 820, a system memory 830, and a system bus 821 that couples various system components including the system memory to the processing unit 820.

Computer 810 typically includes a variety of computer readable media. Computer readable media can be any available media that can be accessed by computer 810 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 830 includes computer storage media in the form of volatile and/or nonvolatile memory such as ROM 831 and RAM 832. A basic input/output system 833 (BIOS), comprising the basic routines that help to transfer information between elements within computer 810, such as during start-up, is typically stored in ROM 831. RAM 832 typically comprises data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, a flash drive reader 857 that reads flash drive 858, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 844, application programs 845, program data 847, and other program modules 846. Additionally, for example, non-volatile memory may include instructions to, for example, discover and configure IT device(s); the creation of device neutral user interface command(s); combinations thereof, and/or the like.

A user may enter commands and information into the computer 810 through input devices such as a keyboard 862, a microphone 863, a camera 864, and a pointing device 861, such as a mouse, trackball or touch pad. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device may also connected to the system bus 821 via an interface, such as a video interface 890. Other devices, such as, for example, speakers 897 and printer 896 may be connected to the system via peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. The modem 872 may be wired or wireless. Examples of wireless devices may comprise, but are not limited to: Wi-Fi and Bluetooth. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used. Additionally, for example, LAN 871 and WAN 873 may provide a network interface to communicate with other distributed infrastructure management device(s); with IT device(s); with users remotely accessing the User Input Interface 860; combinations thereof, and/or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded systems, machines a combination thereof, and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, a combination thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A non-transitory tangible machine readable medium comprising instructions configured to cause at least one processor on an assistant computing device to perform a process comprising:
    a) receiving a request over a network from a requesting computing device to query a dataset located on a remote computing device, the remote computing device residing in a secured data center;
    b) identifying access credential requirements to allow the requesting computing device to access the remote computing device identified in the request;
    c) generating access credentials, employing at least in part, the access credential requirements;
    d) encrypting the access credentials to generate encrypted access credentials;
    e) communicating the encrypted access credentials to the requesting computing device;
    f) receiving at least one set of encrypted results from the requesting computing device;
    g) decrypting the encrypted results to obtain results; and
    h) communicating the results to the requesting computing device.

2. The medium according to claim 1, wherein the encrypted results are in a Flexible Data Representation (FDR) format.

3. The medium according to claim 1, wherein the requesting computing device and assistant computing device are configured to communicate via an external network.

4. The medium according to claim 1, wherein the requesting computing device and assistant computing device are configured to communicate via a wide area network WAN.

5. The medium according to claim 1, wherein the requesting computing device and assistant computing device are configured to communicate via a virtual private network (VPN) connection.

6. The medium according to claim 1, wherein at least one of the assistant computing device and remote computing device comprises a server.

7. The medium according to claim 1, wherein the remote computing device is only electronically accessible through a firewall.

8. The medium according to claim 1, wherein the remote computing device is only electronically accessible through a security appliance.

9. The medium according to claim 1, wherein the process further comprises downloading interface instructions.

10. The medium according to claim 1, wherein the process further comprises downloading a software appliance.

11. The medium according to claim 1, wherein the secured data center is only electronically accessible through a firewall.

12. The medium according to claim 1, wherein the secured data center is only electronically accessible through a security appliance.

13. The medium according to claim 1, wherein the encrypted access credentials are further configured to comprise at least one of the following:
    a) remote login instructions;
    b) remote computing device information name;
    c) remote computing device login password;
    d) remote computing device port number;
    e) remote computing device data store name;
    f) remote computing device login name;
    g) secured data center information name;
    h) secured data center access password;
    i) secured data center port number;
    j) secured data center login name; and
    k) a cryptographic key.

14. The medium according to claim 1, wherein the dataset comprises at least one of the following:
    a) a relational database dataset;
    b) a non-relational database dataset;
    c) a web service query responsive dataset;
    d) an application specific query responsive dataset;
    e) a comma-separated-values (CSV) dataset;
    f) a spreadsheet dataset; and
    g) a plain text dataset.

15. The medium according to claim 1, wherein the dataset is located, at least in part, on a network accessible drive.

16. The medium according to claim 1, wherein the dataset is located, at least in part, within the remote computing device.

17. The medium according to claim 1, wherein the process further comprises employing at least one of the following when decrypting the encrypted access credentials:
    a) a symmetric cypher; and
    b) an asymmetric cypher.

18. The medium according to claim 1, wherein the process further comprises employing at least one of the following when encrypting the query results:
    a) a symmetric cypher; and
    b) an asymmetric cypher.

19. The medium according to claim 1, wherein the process further comprises converting the query results into a Flexible Data Representation (FDR) format.

20. The medium according to claim 1, wherein the report further comprises additional information, the additional information comprising at least one of the following:
   a) logic;
   b) trending information;
   c) template information;
   d) intelligence information;
   e) benchmark information;
   f) data quality information;
   g) decision support information; and
   h) data analysis information.

* * * * *